United States Patent
Hsieh

(10) Patent No.: US 6,400,051 B1
(45) Date of Patent: Jun. 4, 2002

(54) MOTOR ROTOR AND OUTER SHELL MOUNTING STRUCTURE FOR CEILING FAN

(76) Inventor: Frank Hsieh, No. 103, Ta Feng Rd., Sheng Kang Hsiang, Taichung Hsien, Taiwan (TW)

( * ) Notice: Subject to any disclaimer, the term of this patent is extended or adjusted under 35 U.S.C. 154(b) by 0 days.

(21) Appl. No.: 09/903,140

(22) Filed: Jul. 10, 2001

(51) Int. Cl.⁷ .................................................. H02K 5/00
(52) U.S. Cl. ...................... 310/89; 310/67 R; 310/261; 417/423.14
(58) Field of Search ................................ 310/89, 67 R, 310/261; 417/423.7, 423.1, 5, 423.14

(56) References Cited

U.S. PATENT DOCUMENTS

| | | | |
|---|---|---|---|
| 5,019,735 A | * 5/1991 | Lee | 310/89 |
| 5,470,104 A | * 11/1995 | Toshimitsu et al. | 310/90 |
| 5,873,701 A | * 2/1999 | Shiu | 416/205 |
| 5,883,449 A | * 3/1999 | Mehta et al. | 310/60 |
| 6,000,918 A | * 12/1999 | Yu | 417/423.15 |

FOREIGN PATENT DOCUMENTS

JP  402303337 A  * 12/1990

* cited by examiner

Primary Examiner—Nicholas Ponomarenko
Assistant Examiner—Heba Yousri Elkassabgi
(74) Attorney, Agent, or Firm—Pro-Techtor Inter-National Services

(57) ABSTRACT

A motor rotor and outer shell mounting structure for ceiling fan in which the outer shell has inner mounting blocks and outer recessed portions and through holes through the mounting blocks and the recessed portions, and the rotor has flanged top mounting posts and flanged bottom mounting posts respectively positioned on the mounting blocks and fixedly secured thereto by screws.

7 Claims, 6 Drawing Sheets

MOTOR ROTOR AND OUTER SHELL MOUNTING STRUCTURE FOR CEILING FAN

BACKGROUND OF THE INVENTION

The present invention relates to ceiling fans, and more specifically, to a motor rotor and outer shell mounting structure for ceiling fan, which enables the rotor to be quickly and accurately positioned in the outer shell.

A regular ceiling fan motor, as shown in FIG. 1, is generally comprised of an outer shell C, a stator B, and a rotor A. The outer shell C is comprised of a top cover shell and a bottom cover shell. The top cover shell and bottom cover shell of the outer shell C are respectively formed of a metal sheet by stamping. The rotor A is mounted in the outer shell C and fixedly fastened to respective mounting holes C3 of the outer shell C by tie screws D. The stator B is mounted in the stator A inside the outer shell C with its center shaft extended out of the top and bottom center axle hole C1 of the outer shell C. The matching precision of the rotor A and the stator B is subject to the distance between the central axis of the center axle holes C1 and the periphery C2 of the outer shell C. In order to achieve high precision, the outer diameter A1 and inner diameter A2 of the rotor A must be properly trimmed by means of the application of a CNC (computer numerical control). This processing process takes much time, and greatly increases the manufacturing cost of the ceiling fan motor. Further, because the mounting holes C3 are flat holes directly; cut in the outer shell C, the formation of the mounting holes C3 weakens the structural strength of the outer shell C. When tightening up the tie screws D, the outer shell C may be forced to deform, affecting the precision of the positioning of the rotor A and stator B in the outer shell C. A impact may also causes the outer shell C to deform.

SUMMARY OF THE INVENTION

It is one object of the present invention to provide a motor rotor and outer shell mounting structure for ceiling fan, which eliminates the aforesaid drawbacks. According to one aspect of the present invention, the motor rotor and outer shell mounting structure for ceiling fan comprises an outer shell, a stator mounted in the outer shell, and a rotor mounted in the outer shell around the stator for synchronous rotation with the outer shell. The outer shell has inner mounting blocks and outer recessed portions and through holes through the mounting blocks and the recessed portions. The stator has a center shaft extended out of top center axle hole and bottom center axle hole of the outer shell. The rotor has flanged top mounting posts and flanged bottom mounting posts respectively positioned on the mounting blocks and fixedly secured thereto by screws. According to another aspect of the present invention, the flanged top mounting posts and flanged bottom mounting posts each have an axially extended positioning protrusion (flange), and the outer shell has positioning slots adapted to receive the positioning protrusion of each of the flanged top mounting posts and flanged bottom mounting posts for quick positioning of the rotor in the outer shell. According to another aspect of the present invention, the mounting blocks are formed with the recessed portions on the outer shell by stamping, and the formation of the mounting blocks and the recessed portions greatly reinforce the structural strength of the outer shell against deformation.

DETAILED DESCRIPTION OF THE PREFERRED EMBODIMENT

Figure 1:
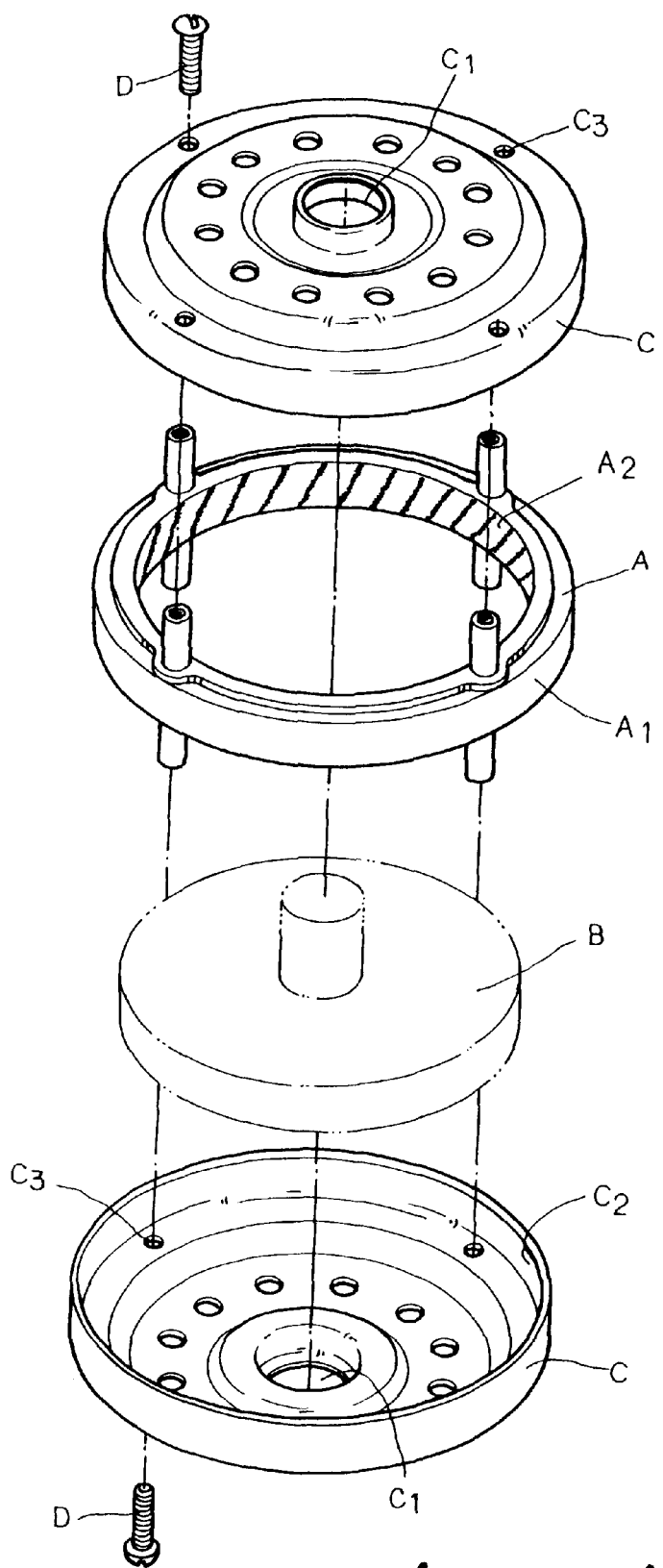
FIG. 1 is an exploded view of a motor rotor and outer shell mounting structure for ceiling fan according to the prior art.
Figure 2:
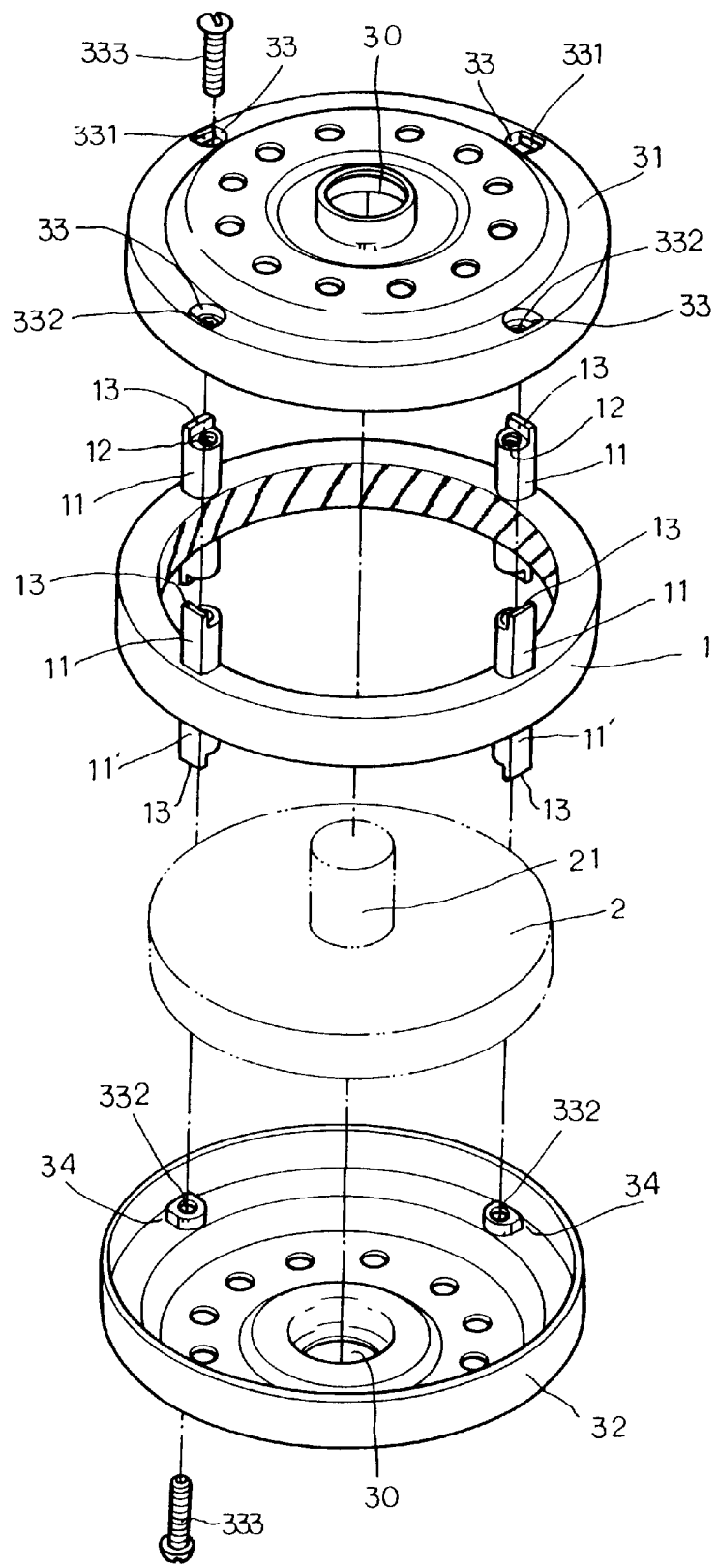
FIG. 2 is an exploded view of a motor rotor and outer shell mounting structure for ceiling fan according to the present invention.
Figure 6:
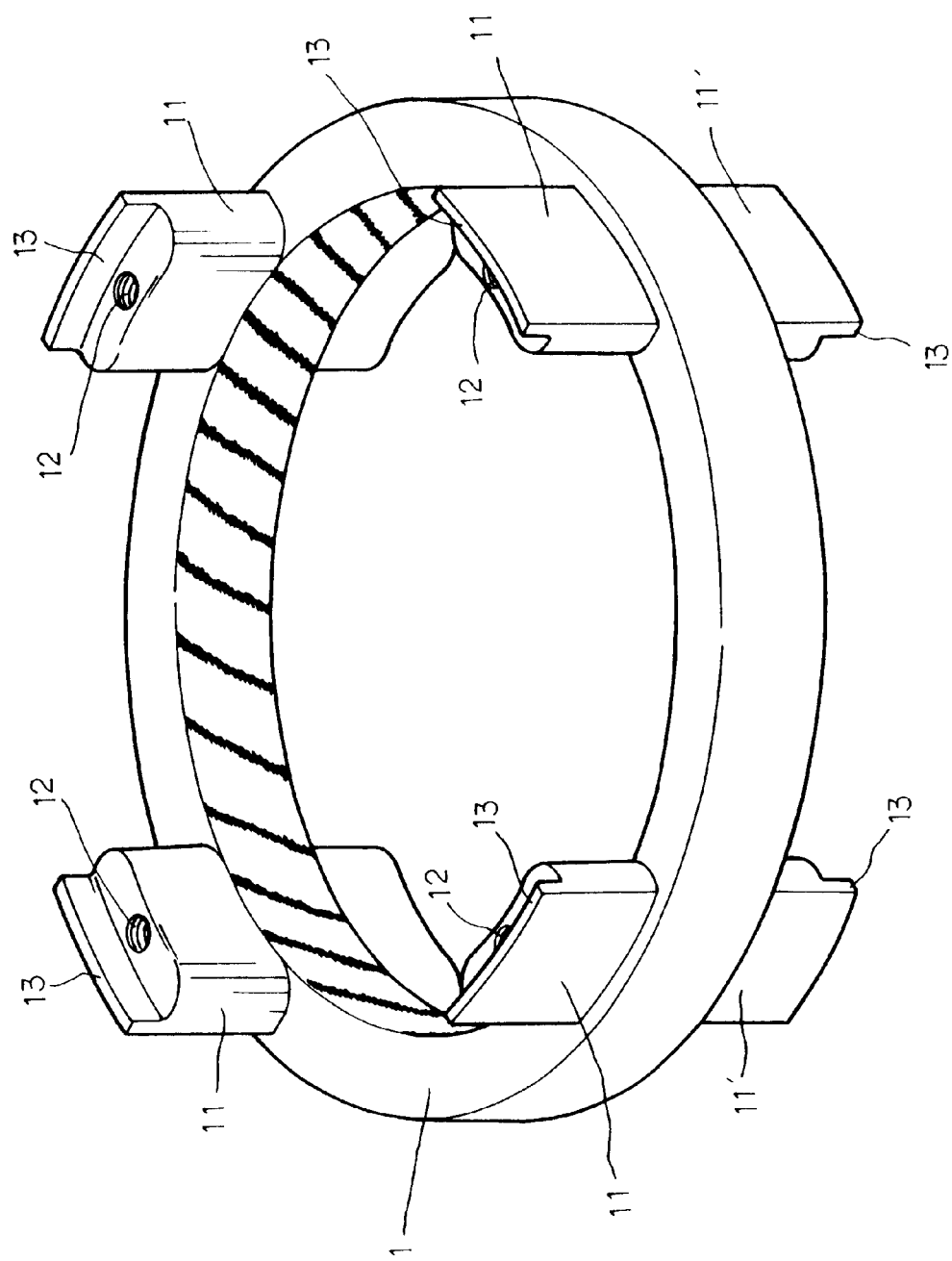
FIG. 6 is elevational view of a rotor for the motor rotor and outer shell mounting structure for ceiling fan according to the second embodiment of the present invention.

Referring to FIG. 2, the invention comprises a rotor 1, a stator 2, and an outer shell 3. The outer shell 3 is comprised of a top cover shell 31 and a bottom cover shell 32. The top cover shell 31 and the bottom cover shell 32 are symmetrical, each comprising a center axle hole 30, a plurality of recessed portions 33 formed in the outside wall at the border area and equiangularly spaced around the center axle hole 30, a plurality of mounting blocks 34 protruded from the inside wall at the border area corresponding to the recessed portions 33, a plurality of through holes 332 respectively disposed in the recessed portions 33 and extended through the mounting blocks 34, and a plurality of positioning slots 331 extended through the outside and inside walls and respectively disposed adjacent to the mounting blocks 34 at an outer side. The stator 2 has a center shaft 21 protruding from the top and bottom sides thereof. The rotor 1 comprises symmetrical top mounting posts 11 and bottom mounting posts 11' corresponding to the mounting blocks 34 of the shells 31;32. The mounting posts 11;11' each having an axially extended screw hole 12 and an axially extended positioning protrusion 13. The mounting posts 11;11' can be made having a circular cross section (see FIG. 2) or arched cross section (see FIG. 6).

Figure 3:
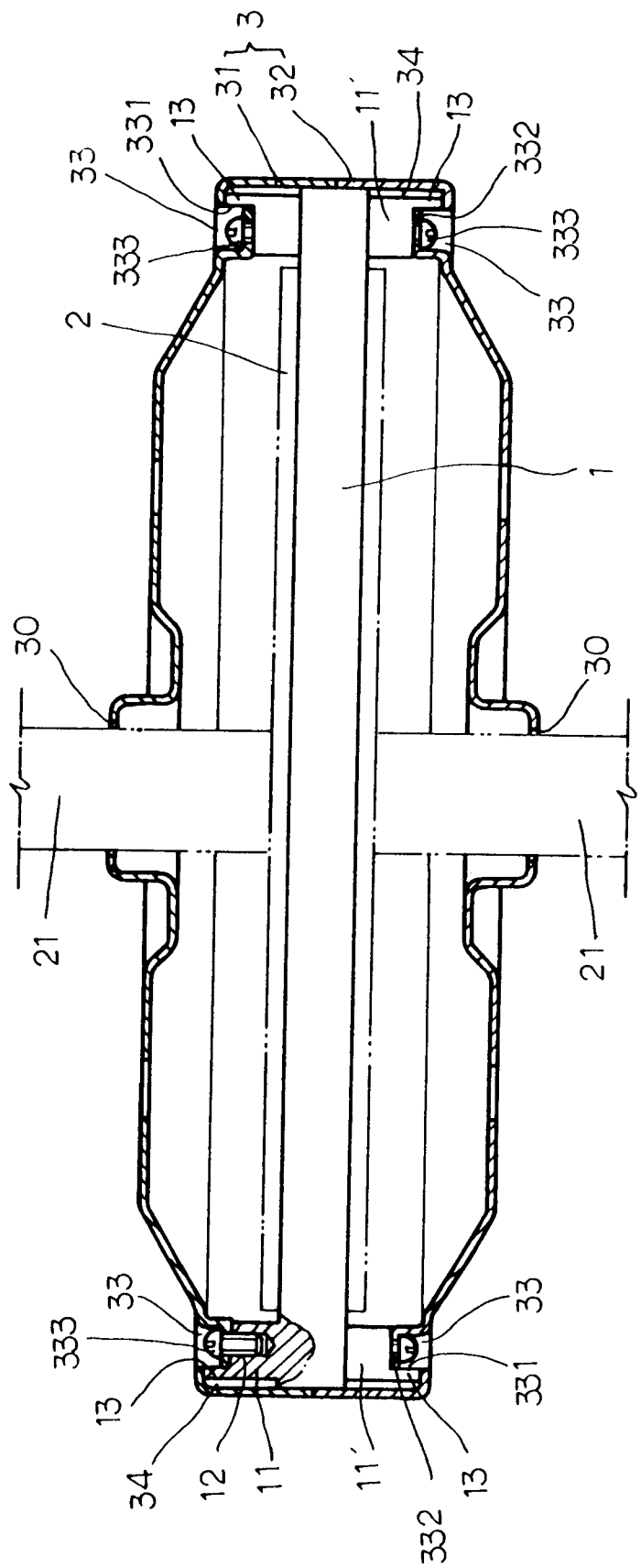
FIG. 3 is a sectional assembly view of the motor rotor and outer shell mounting structure for ceiling fan according to the present invention.

Referring to FIG. 3 and FIG. 2 again, during assembly, the rotor 1 is put in the top cover shell 31 (or bottom cover shell 32) to force the positioning protrusion 13 of each of the top mounting posts 11 (or bottom mounting posts 11') into the positioning slots 331 of the top cover shell 31 (or bottom cover shell 32), keeping the top mounting posts 11 (or bottom mounting posts 11') respectively stopped against the mounting blocks 34, and then screws 333 are respectively inserted into the through holes 332 in the recessed portions 33 of the top cover shell 31 (or bottom cover shell 32) and threaded into the screw holes 12 of the top mounting posts 11 (or bottom mounting pots 11') of the rotor 1 to fixedly secure the top cover shell 31 (or bottom cover shell 32) and the rotor 1 together, and then the stator 2 is put the rotor 1, enabling one end of the center shaft 21 of the stator 2 to be extended out of the top cover shell 31 (or bottom cover shell 32) through the center axle hole 30 of top cover shell 31 (or bottom cover shell 32), and then the bottom cover shell 32 (or top cover shell 31) is closed on the top cover shell 31 (or bottom cover shell 32) to force the positioning protrusion 13 of each of the bottom mounting posts 11 (or top mounting posts 11) into the positioning slots 331 of the bottom cover shell 32 (or top cover shell 31), keeping the bottom mounting posts 11' (or top mounting posts 1) respectively stopped against the respective mounting blocks 34, and then screws 333 are respectively inserted into the through holes 332 in the recessed portions 33 of the bottom cover shell 32 (or bottom cover shell 31) and threaded into the screw holes 12 of the bottom mounting posts 11' (or top mounting pots 11) of the rotor 1 to fixedly secure the bottom cover shell 32 (or top cover shell 31) and the rotor 1 together. The mounting blocks 34 are formed integral with the cover shell 31 or 32 upon formation of the recessed portions 33 by stamping. The formation of the mounting blocks 34 greatly reinforces the structural strength of the cover shell 31 or 32 against deformation.

Figure 4:
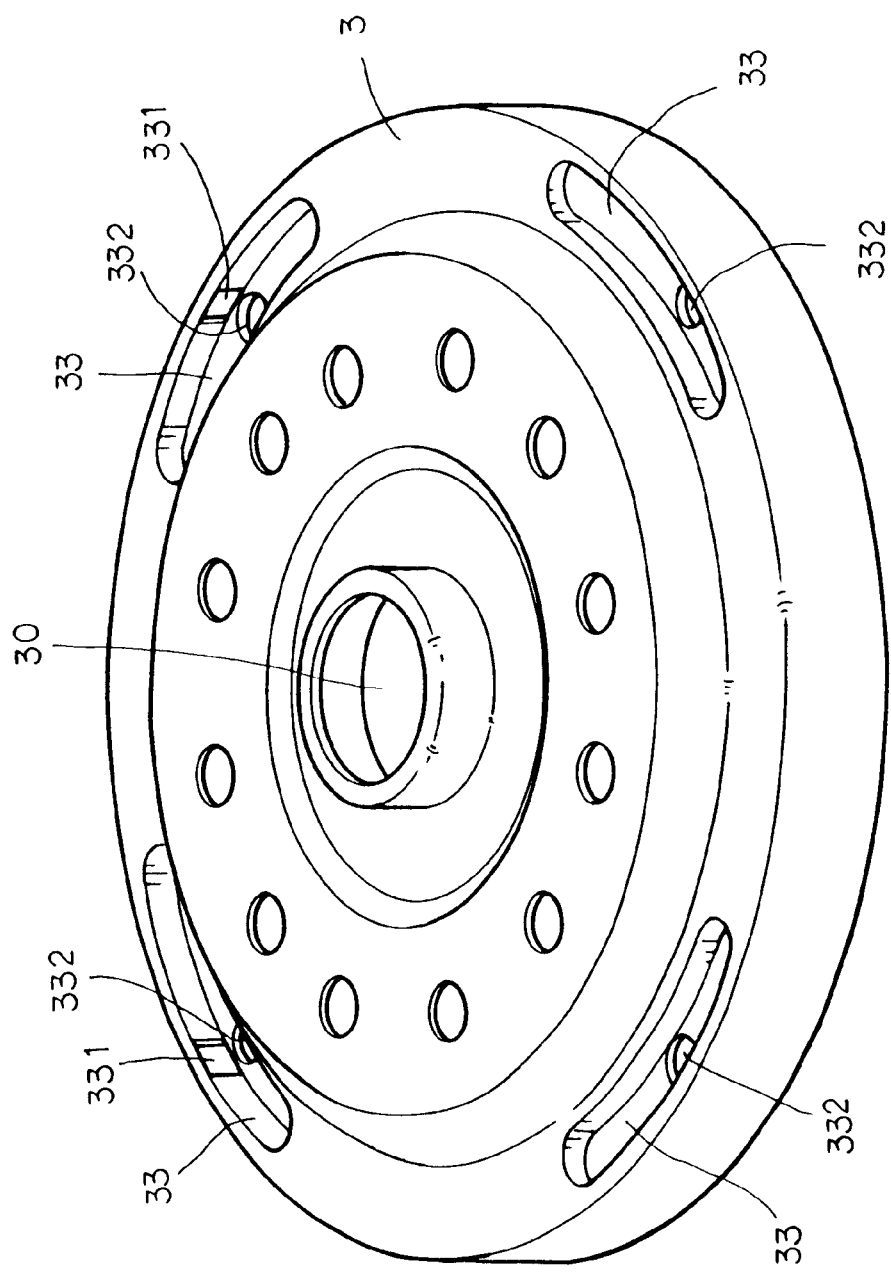
FIG. 4 is an elevational view of a motor rotor and outer shell mounting structure for ceiling fan according to a second embodiment of the present invention.

FIG. 4 shows an alternate form of the present invention. According to this alternate form, the recessed portions 33 are elongated, smoothly arched grooves, and at least one through hole 332 is respectively formed in each of the recessed portions 33. The formation of the elongated, smoothly arched recessed portions 33 reinforces the structural strength of the outer shell 3 against deformation.

Figure 5:
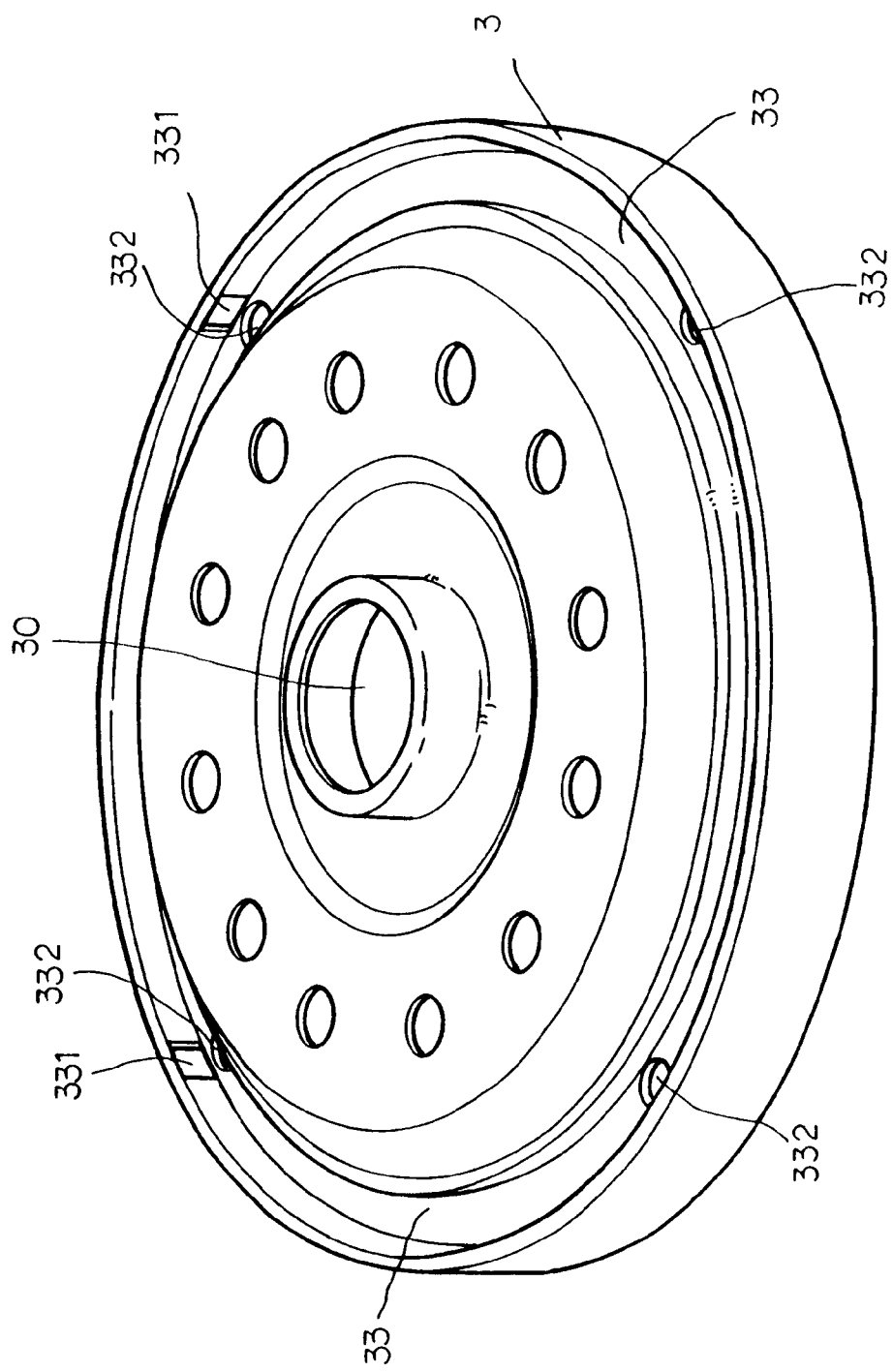
FIG. 5 is an elevational view of a motor rotor and outer shell mounting structure for ceiling fan according to a third embodiment of the present invention.

FIG. 5 shows another alternate form of the present invention. According to this alternate form, the recessed portions 33 form an annular groove, the through holes 332 are equiangularly spaced in the annular groove formed of the recessed portions 33, and the positioning slots 331 are disposed at an outer side in the annular groove formed of the recessed portions 33 adjacent to the through holes 332.

A prototype of motor rotor and outer shell mounting structure for ceiling fan has been constructed with the features of FIGS. 2~6. The motor rotor and outer shell mounting structure functions smoothly to provide all of the features discussed earlier.

Although particular embodiments of the invention have been described in detail for purposes: of illustration, various modifications and enhancements may be made without departing from the spirit and scope of the invention. Accordingly, the invention is not to be limited except as by the appended claims.

What the invention claimed is:

1. A motor rotor and outer shell mounting structure comprising: an outer shell formed of a top cover shell and a bottom cover shell, said top cover shell and said bottom cover shell each having a center axle hole, a stator mounted in said outer shell, said stator having a center shaft respectively extended out of the center axle hole of said bottom cover shell and the center axle hole of said top cover shell, and a rotor mounted in said outer shell around said stator for synchronous rotation with said outer shell relative to said stator, wherein said top cover shell and said bottom cover shell are symmetrical, each comprising an outside wall, an inside wall, at least one recessed portion formed in said outside wall, a plurality of mounting blocks protrude from said inside wall and equiangularly spaced around the center axle hole thereof, and a plurality of positioning slots extended through said outside wall and said inside wall and respectively disposed adjacent to said mounting blocks at an outer side; said rotor comprises a plurality of top mounting posts and bottom mounting posts located between the mounting blocks of said top cover shell and the mounting blocks of said bottom cover shell and respectively fixedly fastened to the mounting blocks of said top cover shell and the mounting blocks of said bottom cover shell by screws, said top mounting posts and said bottom mounting posts each having an axially extended positioning protrusion respectively engaged into the positioning slots of top cover shell and said bottom cover shell.

2. The motor rotor and outer shell mounting structure of claim 1 wherein said at least one recessed portion is comprised of a plurality of elongated, smoothly arched recessed portions corresponding to said mounting blocks.

3. The motor rotor and outer shell mounting structure of claim 1 wherein said at least one recessed portion is comprised of an annular groove formed in said outside wall around the border of said outer shell.

4. The motor rotor and outer shell mounting structure of claim 1 wherein said top cover shell and said bottom cover shell each further comprise a plurality of through holes respectively formed in at least one said recessed portion and extended through said mounting blocks.

5. The motor rotor and outer shell mounting structure of claim 1 wherein said top mounting posts and said bottom mounting posts each have an axially extended screw hole respectively fastened to said mounting blocks by respective screws.

6. The motor rotor and outer shell mounting structure of claim 1 wherein said top mounting posts and said bottom mounting posts have a circular cross section.

7. The motor rotor and outer shell mounting structure of claim 1 wherein said top mounting posts and said bottom mounting posts have an arched cross section.

\* \* \* \* \*